July 24, 1962 S. D. BRESKEND 3,046,483
PASSIVE PULSE WIDTH DISCRIMINATOR UTILIZING DELAY LINE REFLECTIONS
Filed Dec. 30, 1960
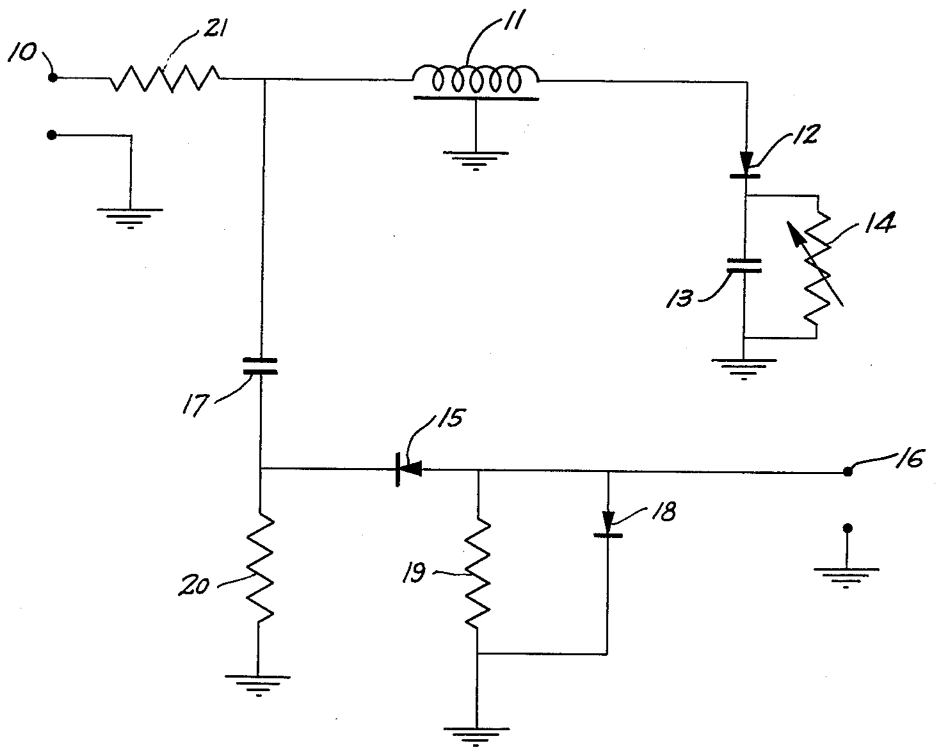
INVENTOR
SAM D. BRESKEND
BY S. J. Rotondi, A. J. Dupont, J. E. McGee & J. P. Edgerton 3,046,483

PASSINE PULSE WIDTH DISCRIMINATOR UTILIZING DELAY LINE REFLECTIONS

Sam D. Breskend, Washington, D.C., assignor to the United States of America as represented by the Secretary of the Army Filed Dec. 30, 1960, Ser. No. 79,938
2 Claims. (Cl. 328—56)
(Granted under Title 35, U.S. Code (1952), sec. 266)

The invention described herein may be manufactured and used by or for the Government for governmental purposes without the payment to me of any royalty thereon.

This invention relates generally to discriminators and more particularly to a pulse width discriminator which is responsive only to pulses of no more than a predetermined width.

A discriminator of this type finds great utility in radar receivers for example, where it is necessary to separate target signals which are usually of extremely short duration from ground clutter and the like which are in the form of long blocks of signals.

Other applications for the discriminator are in pulse-type telemetry systems and in pulsed proximity fuzes where it is desired to detonate the explosive after receiving a predetermined number of pulses having a designated width.

A feature of the instant invention is the use of a delay line terminated in a combination of passive circuit elements whose impedance is controlled by the width of a pulse applied to the input end of the delay line.

Such an arrangement is extremely desirable since it obviates the need for differentiators and complex detection schemes which are usually found in the prior art pulse width discriminator.

An object of the instant invention, therefore, is to provide a new and improved pulse width discriminator.

A further object is to provide a pulse width discriminator wherein the discriminating function is performed by a combination of passive circuit elements whose impedance is varied in accordance with the pulse width.

Other objects, advantages and features of the invention will become apparent from a consideration of the following description taken in conjunction with the single figure of the drawing which shows the preferred embodiment of the invention.

Referring now to the drawing, there is shown a delay line 11 terminated at one end by a diode 12 connected in series with capacitor 13. In parallel with capacitor 13 is variable resistor 14 whose resistance is very large compared with the characteristic impedance of delay line 11. Connected to the other end of delay line 11, through a D.C. blocking condenser 17, is a diode 15 poled so as to pass only negative pulses to output terminal 16. A resistor 20 serves as a D.C. return path for diode 15.

Positive input pulses are applied to the delay line via input terminal 10. The time delay of the delay line 11 is chosen to be equal to one half the duration of the input pulses which are to be passed to output terminal 16 and the time constant of the series combination of diode 12 and capacitor 13 is chosen to be large in comparison with the pulse duration. The time constant of the combination of capacitor 13 and resistor 14 is adjusted so as to be small in comparison with the spacing between successive pulses.

In order to understand the operation of the pulse width discriminator, it must be kept in mind that a delay line terminated in an open circuit will reflect a pulse without changing the polarity, while a delay line terminated in a short circuit will reflect a pulse with an inversion of polarity. Positive input pulses of a predetermined duration applied to input terminal 10 will travel down delay line 11. Since the pulse duration is short in comparison with the time constant of diode 12 and capacitor 13, very little charge will be impressed upon the capacitor. The pulse will therefore "see" a short circuit termination and will be reflected as a negative pulse of slightly lower amplitude due to the attenuation of the line. This reflected negative pulse will be passed by diode 15 to output terminal 16. Diode 18 connected across load resistor 19 shorts out any positive signal which might pass diode 15.

However, if a wider positive pulse is sent down the delay line, capacitor 13 will become fully charged and diode 12 will be back-biased. Thus, the pulse will effectively see an open circuit termination and will be reflected with no change in polarity. The reflected positive pulse will not appear at output terminal 16 due to the blocking action of diode 15. The effective impedance of circuit elements 15, 17, 18, 19, 20 and 21 must be equal to the characteristic impedance of delay 11, in order to prevent any unwanted reflections of the returned pulse.

While the leading edge of a wide pulse will "see" a short circuit termination and be reflected with a change in polarity, it will not appear at the output terminal. This is so because, as explained above, the electrical length of the delay line is equal to one-half the width of the desired pulse. Consequently, when the reflected leading edge of the wide pulse reaches the input end of the delay line, it will be canceled by that part of the pulse which is just entering the delay line.

Any remnant charge on capacitor 13 will be dissipated through resistor 14 before the next pulse is received, due to the above-discussed relationship between the pulse repetition rate and the RC time constant of capacitor 13 and resistor 14. It should also be realized that this circuit will also discriminate against pulses which are narrower than the preselected width. This can be accomplished by choosing a delay line having a frequency characteristic such that high frequency components are severely attenuated. Since very narrow pulses contain more high frequency components than do wider ones, an amplitude sensitive output device, such as a Schmitt Trigger Circuit connected to terminal 16, would provide an output only for input pulses of a designated width. A capacitor connected to the input terminal of the Schmitt Trigger would be necessary to stretch the narrow pulses to a width at which the Schmitt Trigger is sensitive.

It should also be realized that although a preferred embodiment of the invention has been described, various modifications are possible. For example, resistor 14 could be adjusted so that capacitor 13 does not completely discharge between successive pulses. Then, after a predetermined number of pulses have been received, the termination would appear as an open circuit and no further output would be obtained. In this way, the circuit could be used as a counter.

I claim as my invention:

1. A pulse width discriminator comprising: a delay line, means for applying input pulses to one end of said delay line, impedance means connected to the other end of said delay line for terminating said delay line in a short circuit in response to input pulses of a predetermined width and in an open circuit in response to pulses of a width greater than said predetermined width.

2. The discriminator claimed in claim 1, including an output terminal and means connected to said one end of the delay line for passing only pulses of said predetermined width to said output terminal.

References Cited in the file of this patent

UNITED STATES PATENTS

| | | |
|---|---|---|
| 2,873,386 | Schlei | Feb. 10, 1959 |
| 2,961,609 | Manring | Nov. 22, 1960 |

OTHER REFERENCES

Tryon: (Abstract from application #778,969); 632 O.G. 1239; March 29, 1950.